(12) United States Patent
Daniels et al.

(10) Patent No.: US 10,129,070 B2
(45) Date of Patent: Nov. 13, 2018

(54) METHODS AND SYSTEMS FOR CORRECTION OF CARRIER FREQUENCY OFFSET (CFO) IN WIRELESS TRANSCEIVERS

(71) Applicant: Phazr, Inc., Allen, TX (US)

(72) Inventors: Robert Clark Daniels, Round Rock, TX (US); Khurram Muhammad, Fort Worth, TX (US); Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 15/392,470

(22) Filed: Dec. 28, 2016

(65) Prior Publication Data

US 2018/0183642 A1    Jun. 28, 2018

(51) Int. Cl.
*H04L 27/26* (2006.01)
*H04L 27/00* (2006.01)
*H04B 1/10* (2006.01)

(52) U.S. Cl.
CPC ......... *H04L 27/266* (2013.01); *H04B 1/1036* (2013.01); *H04L 27/0014* (2013.01); *H04B 2001/1072* (2013.01); *H04L 2027/0026* (2013.01); *H04L 2027/0034* (2013.01); *H04L 2027/0065* (2013.01)

(58) Field of Classification Search
CPC ............ H04B 17/104; H04B 1/1036; H04B 2001/1072; H04L 27/266; H04L 27/0014; H04L 2027/0026; H04L 2027/0034; H04L 2027/0065
See application file for complete search history.

(56) References Cited

U.S. PATENT DOCUMENTS

| | | | | |
|---|---|---|---|---|
| 6,044,119 A | * | 3/2000 | Sato | H04B 1/7087 375/344 |
| 2014/0220919 A1 | * | 8/2014 | Yang | H04L 27/16 455/192.2 |
| 2016/0277223 A1 | * | 9/2016 | Shen | H03J 1/0008 |

* cited by examiner

*Primary Examiner* — Chieh M Fan
*Assistant Examiner* — Sung Ahn
(74) *Attorney, Agent, or Firm* — Michael A. Rahman

(57) ABSTRACT

Methods and systems for correcting carrier frequency offsets (CFOs) in a wireless transceiver are disclosed. The method includes receiving a first predetermined number of data packets and analyzing the first predetermined number of data packets to determine one or more wireless link quality metrics. The method includes adjusting a local oscillator in accordance with a first local oscillator adjustment strategy. The method includes receiving a second predetermined number of data packets and analyzing the second predetermined number of data packets to determine the one or more wireless link quality metrics. The method includes repeating the first local oscillator adjustment strategy if the wireless link quality metrics improve. The method includes changing to a second local oscillator adjustment strategy if the wireless link quality metrics worsen and adjusting the local oscillator in accordance with the second local oscillator adjustment strategy.

11 Claims, 10 Drawing Sheets

METHODS AND SYSTEMS FOR CORRECTION OF CARRIER FREQUENCY OFFSET (CFO) IN WIRELESS TRANSCEIVERS

TECHNICAL FIELD

This application relates generally to wireless communications, and more specifically to methods and systems for correction of carrier frequency offset (CFO) in wireless transceivers.

BACKGROUND

Internet connectivity has transformed life everywhere as more people connect to the Internet to chat with friends and family, watch videos, listen to streamed music, or conduct online banking and e-commerce. The two primary means for access to the Internet are wired broadband and wireless. Current wired broadband Internet access is based on three different standards: Digital Subscriber Line (DSL); Data Over Cable Service Interface Specification (DOCSIS); and Fiber-to-Home (FTTH). The wireless access is based on two standards: Wide Area Network (WAN), also referred to as the Fourth Generation Long Term Evolution (4G LTE); and Local Area Network (LAN), also referred to as Wi-Fi. Wi-Fi is generally used indoors as short-range wireless extension of wired broadband systems. The 4G LTE on the other hand provides wide area long-range connectivity using dedicated infrastructure such as cell towers and backhaul to connect to the Internet.

In order to address the rapid growth in data traffic, next generation WLAN and cellular systems are expected to operate at higher frequencies where abundant spectrum is available. For example, at millimeter wave frequencies (28 GHz and above), radio spectrum use is lighter. A large number of small antennas operating at millimeter wave frequencies may be used to provide the increased capacity required in the future. The small size antennas are enabled by carrier waves that are millimeters long compared to centimeter long waves at currently used lower frequencies.

A number of wireless transceivers have been proposed for millimeter wave bands. The proposed wireless transceivers generally include multiple signal paths where each signal path may be connected to one or more antennas. A drawback of the proposed transceivers is that in transmit paths during up-conversion as digital signals are transformed into analog signals, their carrier frequencies are shifted. Similarly, in receive paths during down-conversion as analog signals are transformed into digital signals, their carrier frequencies are shifted. The shift in carrier frequency during up-conversion and down-conversion is generally referred to as a carrier frequency offset (CFO) which introduces unpredictability in the operation of the transceivers.

FIGS. 1 and 2 illustrate CFOs during up-conversion and down-conversion, respectively. For example, in FIG. 1 the kth transmitted analog baseband signal is ideally upconverted to frequency fk, ideal, but is actually upconverted to frequency fk=fk, ideal+fk, txoffset. If fk, txoffset is negative, fk, ideal shifts to a lower frequency, as demonstrated in FIG. 1. If fk, txoffset is positive, fk, ideal shifts to a higher frequency. Similarly, in FIG. 2 the kth received analog RF signal is ideally down-converted to frequency 0 Hz, but is actually down-converted to frequency fk, txoffset+fk, rxoffset.

Existing methods to correct or mitigate CFOs rely on the assumption that all signal paths have the same CFO value. However, in a wireless link featuring multiple signal paths each with different center frequencies, each signal path may have a different CFO value and, furthermore, the phase characteristics may be different in each signal. Therefore, a single CFO estimate for all signal paths may result in substantial residual CFO on each signal path after correction. Uncorrected CFOs cause progressive phase rotation of decoded complex baseband symbols. Consequently, the received error vector magnitude (EVM), which is a measure of received signal integrity, progressively degrades as the length of the data packets increase, thereby reducing packet lengths.

SUMMARY

According to disclosed embodiments, methods and systems for correcting carrier frequency offsets (CFOs) in a wireless transceiver are provided. The CFOs which are generated during up-conversion and down-conversion on multiple signal paths are corrected.

In one aspect, the method includes receiving a first predetermined number of data packets and analyzing the first predetermined number of data packets to determine one or more wireless link quality metrics. The method includes selecting a first local oscillator adjustment strategy, and adjusting a local oscillator in accordance with the first local oscillator adjustment strategy.

The method includes receiving a second predetermined number of data packets and analyzing the second predetermined number of data packets to determine the one or more wireless link quality metrics. The method includes repeating the first local oscillator adjustment strategy if the wireless link quality metrics improve and adjusting the local oscillator in accordance with the first local oscillator adjustment strategy. The method includes changing to a second local oscillator adjustment strategy if the wireless link quality metrics worsen and adjusting the local oscillator in accordance with the second local oscillator adjustment strategy.

The method includes receiving a third predetermined number of data packets and analyzing the third predetermined number of data packets to determine the one or more link quality metrics. The method includes repeating the second local oscillator adjustment strategy if the wireless link quality metrics improve and adjusting the local oscillator in accordance with the second local oscillator adjustment strategy. The method includes changing to the first local oscillator adjustment strategy if the wireless link quality worsen and adjusting the local oscillator in accordance with the first local oscillator adjustment strategy.

In one aspect, the first local oscillator adjustment strategy is increasing the local oscillator frequency by a predetermined amount, and the second local oscillator adjustment strategy is decreasing the local oscillator frequency by a predetermined amount. In one aspect, the wireless link quality metrics include an error vector magnitude (EVM).

DETAILED DESCRIPTION OF THE DISCLOSED EMBODIMENTS

Figure 1:
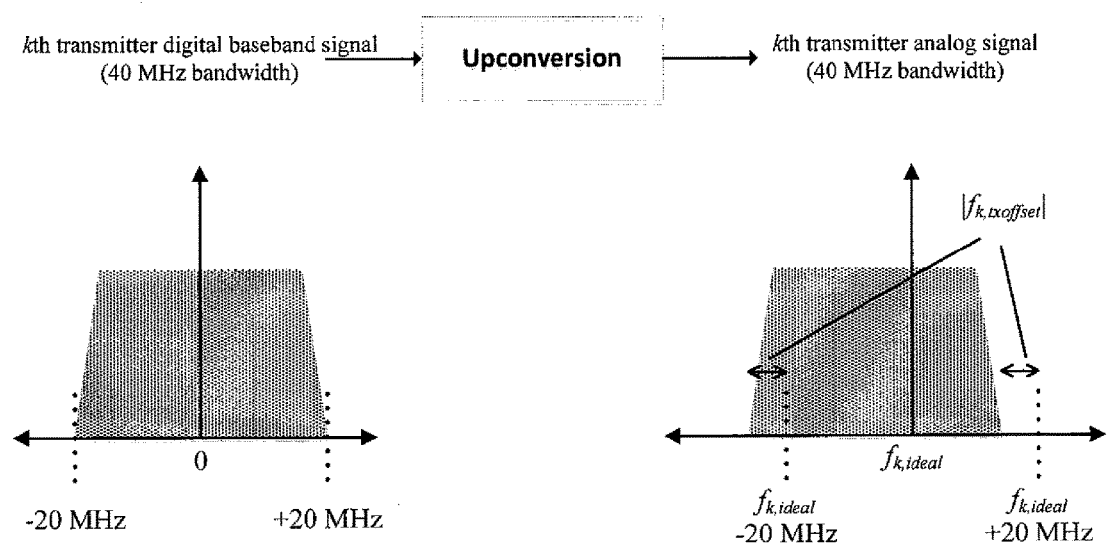
FIGS. 1 and 2 illustrate CFOs during up-conversion and down-conversion, respectively.
Figure 2:
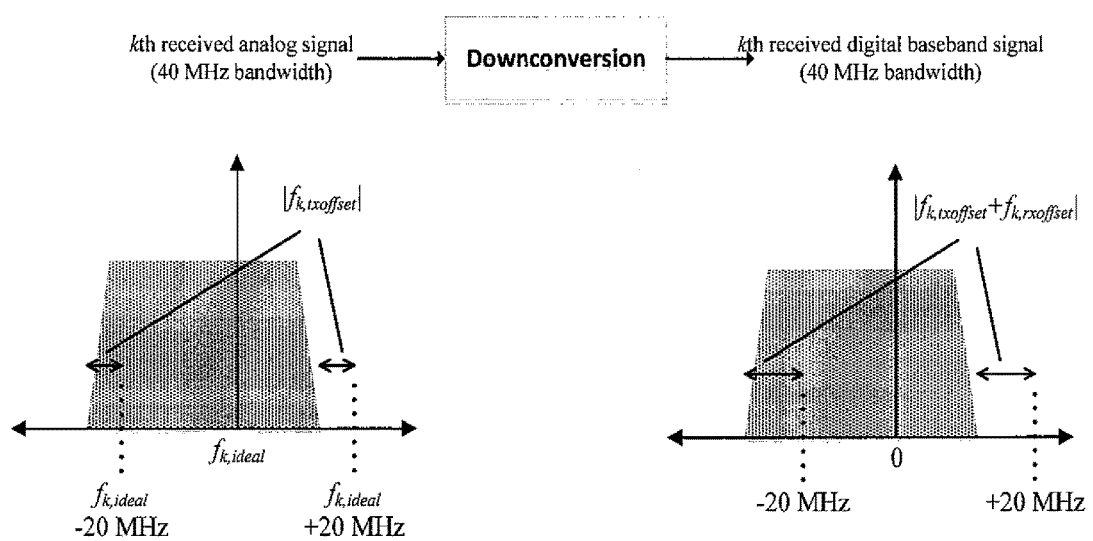
Figure 3:
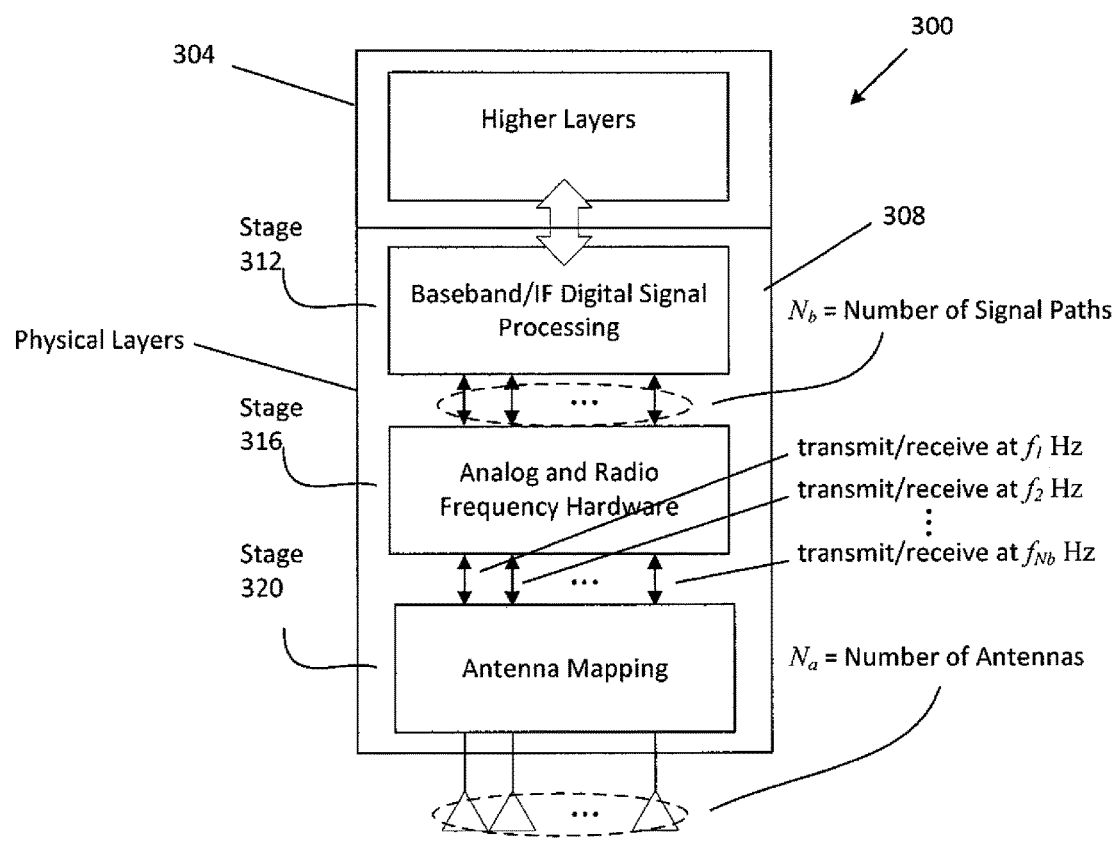
FIG. 3 illustrates a wireless transceiver in accordance with disclosed embodiments.

FIG. 3 illustrates wireless transceiver 300 in accordance with disclosed embodiments. Transceiver 300 is configured to transmit data to wireless devices and receive data from wireless devices in a communication network.

According to some disclosed embodiments, transceiver 300 transmits signals concurrently in multiple signal paths, but the concurrent transmit signals are not necessarily centered at the same frequency. Also, transceiver 300 receives signals concurrently in multiple signal paths, but the concurrent receive signals are not necessarily centered at the same frequency.

According to disclosed embodiments, transceiver 300 can be characterized by layers where each layer performs a different task. Transceiver 300 include higher layers 304 and physical layers 308. Higher layers 304 perform tasks which are typically associated with application layer, session layer, transport layer, network layer and data link layer.

Figure 4:
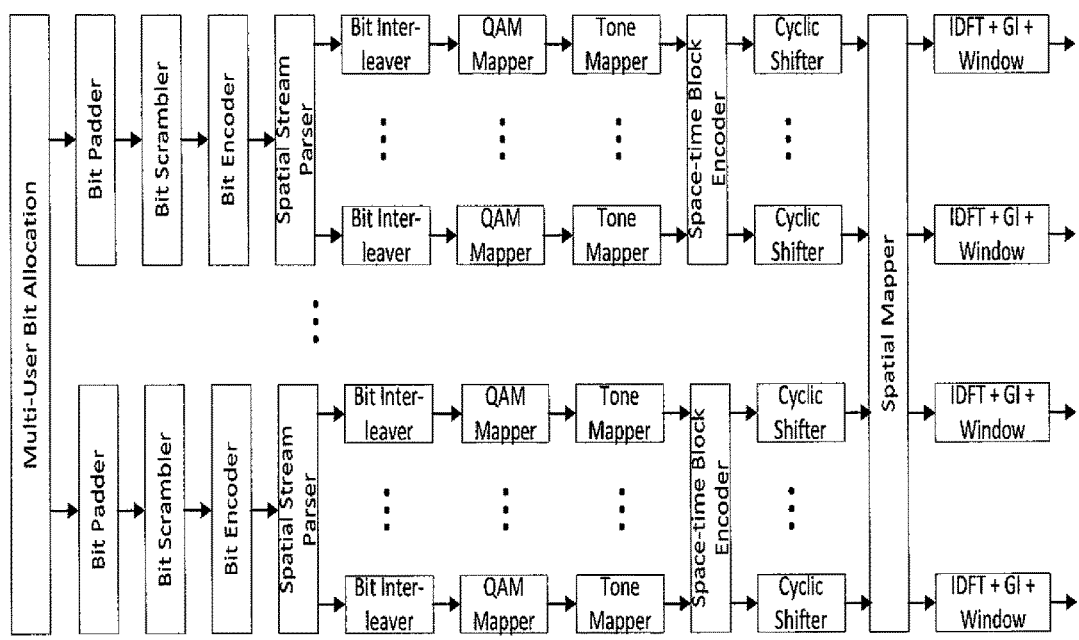
FIG. 4 illustrates exemplary baseband digital signal processing.

According to disclosed embodiments, physical layers 308 are divided in stages 312, 316, and 320. In stage 312, data from higher layers 304 are encapsulated into or extracted from digital representations of the analog signals that are sent to or received over antennas, respectively. In other embodiments, in stage 312 digital signal processing may also occur at an intermediate frequency (IF), where the center frequency of digital signals is not 0 Hz. FIG. 4 illustrates an exemplary baseband transmitter digital signal processing in accordance with IEEE 802.11 standard. Referring to FIG. 3, each of the Nb signal paths have an associated bandwidth.

Figure 5:
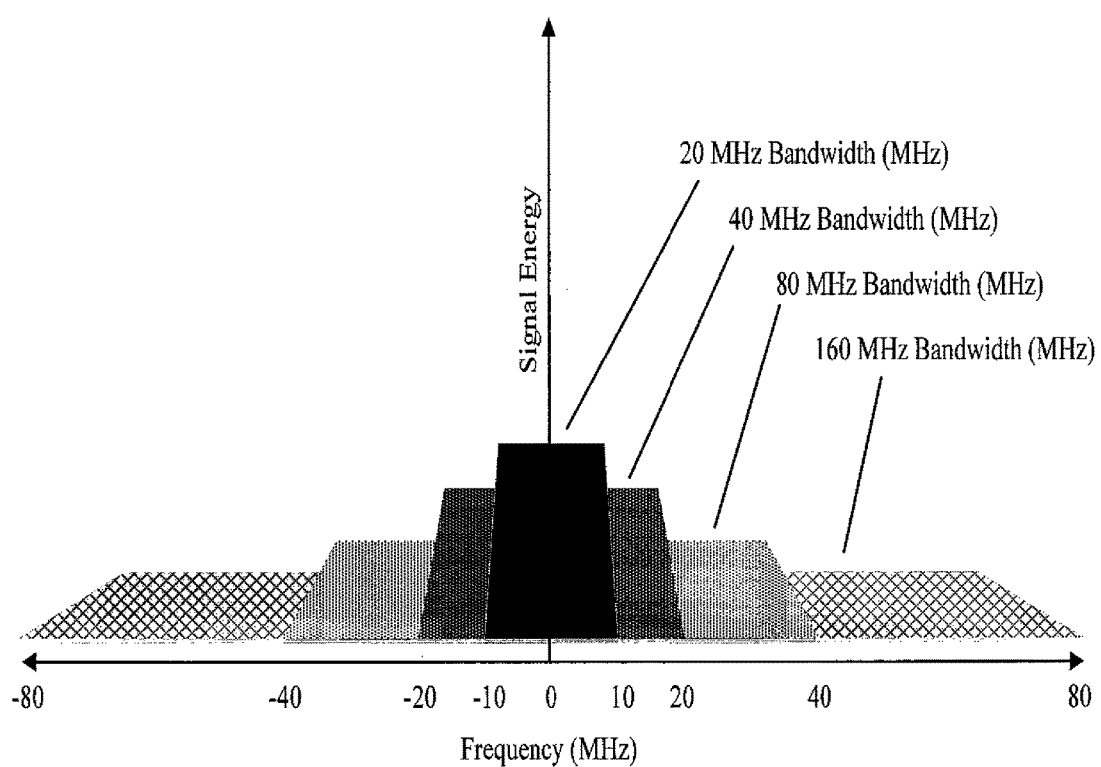
FIG. 5 illustrates the frequency spectrum of signals generated by a wireless transmitter.
Figure 6:
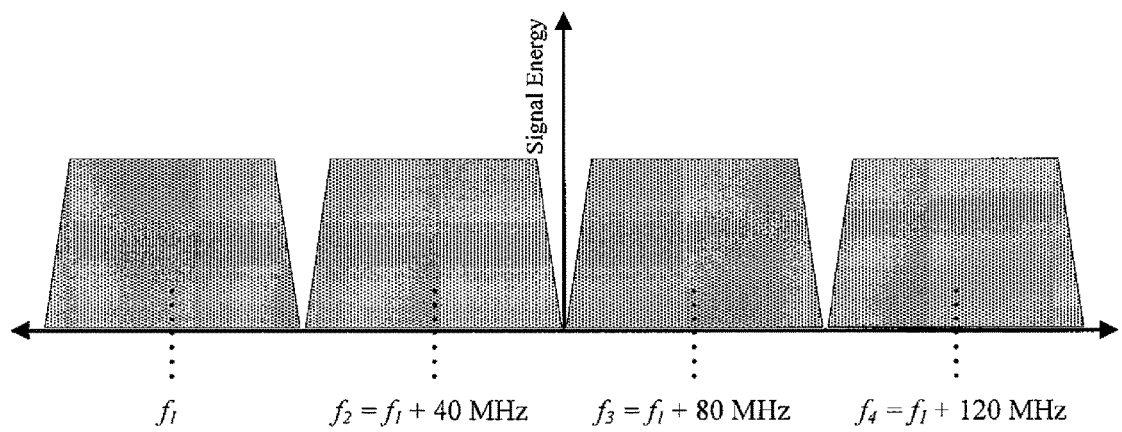
FIG. 6 illustrates transformation of baseband signal during analog up-conversion.

Referring to FIG. 3, in stage 316, in the transmitter the digital signals are transformed into analog signals, where each analog signal is associated with a center frequency. Also, in stage 316, in the receiver the analog signals are transformed into digital signals, where each analog signal is associated with a center frequency. FIG. 5 shows the frequency spectrum of signals generated by a wireless transmitter in stage 312 in accordance with IEEE 802.11 standard with 40 MHz bandwidth and Nb=4. As shown in FIG. 6, analog up-conversion transforms each baseband signal to four different center frequencies (f1, f2, f3, f4), each separated by 40 MHz.

Referring to FIG. 3, in stage 320, the analog signal paths are connected to a plurality of antennas through an antenna mapping process. According to disclosed embodiments, the number of antennas is not necessarily equal to the number of signal paths either at the transmitter or the receiver. For example, in hybrid precoding transceivers, a single analog signal path may be connected to a plurality of antennas through phase shifters and splitters/combiners.

Figure 7:
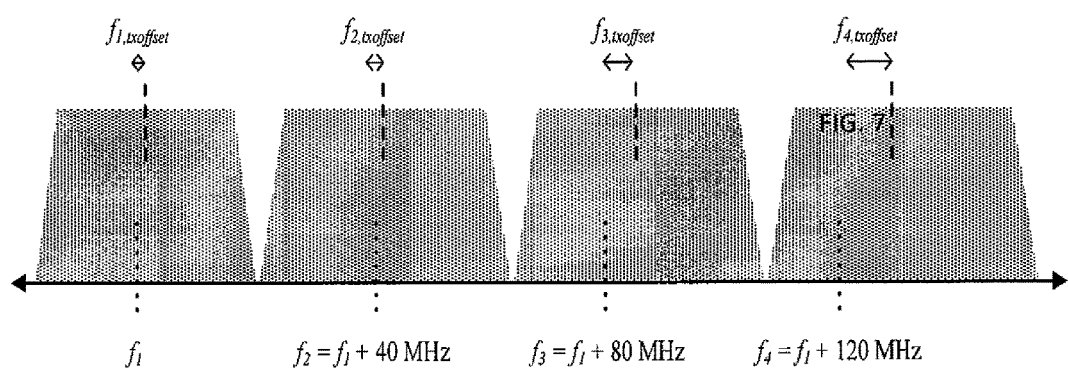
FIG. 7 illustrates effects of up-conversion.

As discussed before, when the digital signal are transformed into or from analog signals, their carrier frequency is shifted during a process known as upconversion or downconversion, respectively. In general, if the upconversion frequencies or downconversion frequencies are not the same, their offsets are also not the same. FIG. 7 illustrates an example of how CFO affects the up-conversion process in the IEEE 802.11 signal spectrum.

Because up-conversion and down-conversion processes occur on separate devices in a single direction of a communication link, the fundamental frequency references at the transmitter and receiver are different and have unique CFOs. Consequently, after down-conversion at the receiver in a communication link, each of the Nb digital signal paths will have Nb unique CFOs if each analog signal path occupies a different frequency after up-conversion at the transmitter and before down-conversion at the receiver.

Figure 8:
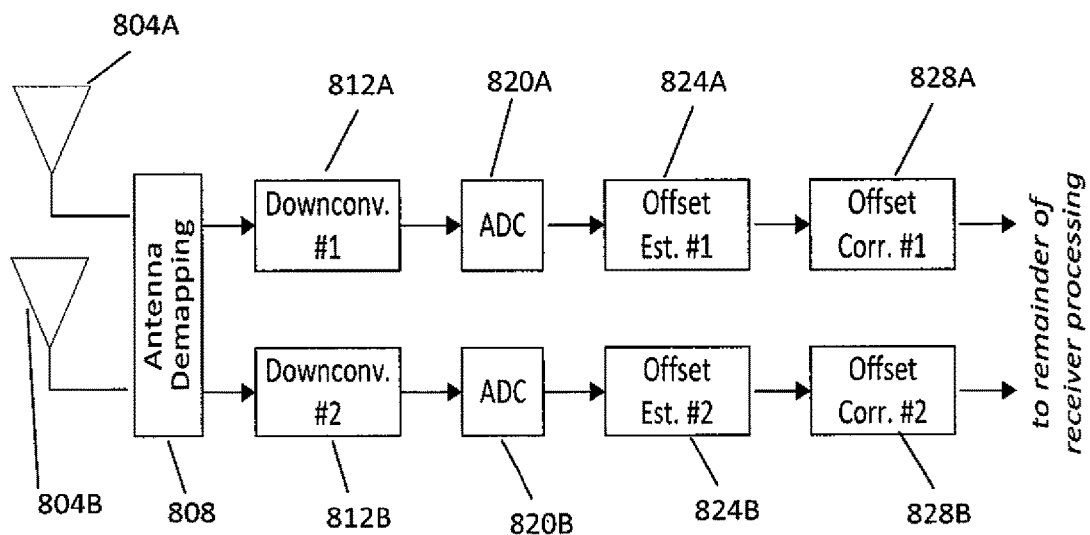
FIG. 8 is a block diagram for estimation and correction of CFO.

According to disclosed embodiments, physical layer processing is performed at the receiver after down-conversion to estimate and remove CFO on each signal path. FIG. 8 illustrates a block diagram for estimation and correction of CFO in a receiver 800 featuring two signal paths (Na=Nb=2) in accordance with disclosed embodiments. As shown in FIG. 8, analog RF signals received by antennas 804A and 804B are de-mapped by module 808 and then down-converted by down-converters 812A and 812B. The two down-converted analog signals are transformed into digital signals by analog to digital converters 820A and 820B. Following transformation of the analog signals into digital signals, CFO estimation is performed on each of the signal paths by CFO estimation modules 824A and 824B, respectively. According to disclosed embodiments, cross-correlation computations may be performed on each signal path to compute CFO estimates. Following CFO estimation, CFO correction is performed by CFO correction modules 828A and 828B. According to disclosed embodiments, CFO correction may be performed by numerically controlled oscillators (NCOs) on each signal path. According to some disclosed embodiments, each NCO digitally adjusts the frequency offset in each signal path. CFO estimation and CFO correction may also share information between paths to improve performance. For example, CFO estimation processes may share information about noise variance estimates across signal paths to improve accuracy of noise variance estimates. Accurate noise variance estimates may improve CFO correction.

Figure 9:
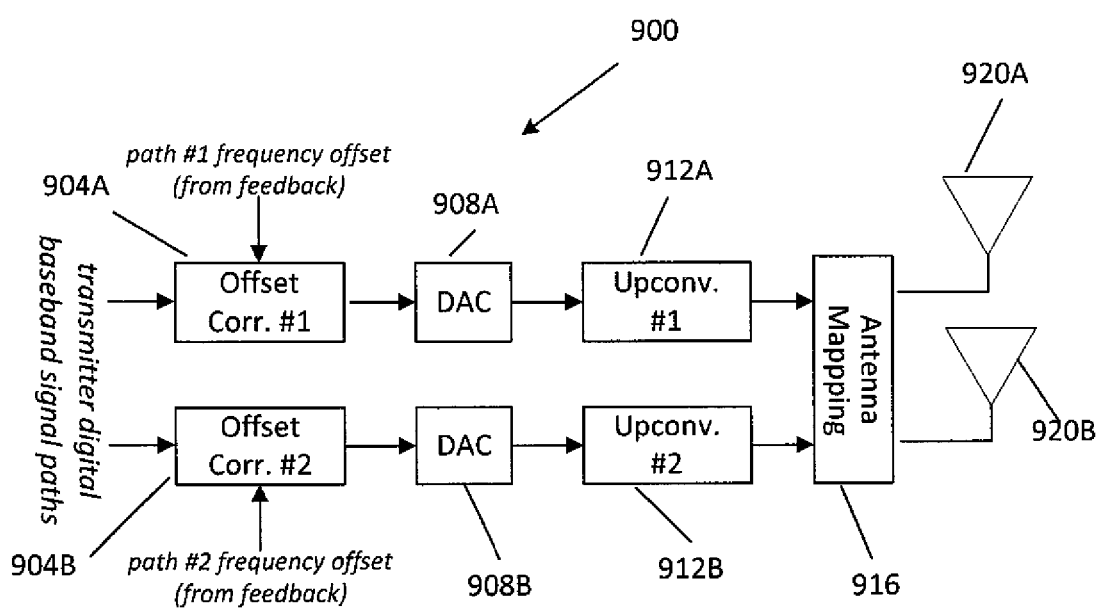
FIG. 9 illustrates an exemplary transmitter configured to correct CFO.

According to disclosed embodiments, CFO correction may be performed at the transmitter by physical layer processing. FIG. 9 illustrates an exemplary transmitter 900 configured to correct CFO on each signal path. As shown in FIG. 9, digital baseband signals are corrected for CFO on each signal path by CFO correction modules 904A and 904B. The digital signals are next converted to analog signals by digital to analog converters 908A and 908B, and are then upconverted by mixers 912A and 912B. The upconverted signals are subjected to antenna mapping by mapping module 916 and transmitted wirelessly by antennas 920A and 920B.

According to disclosed embodiments, a method for correcting CFO at the receiver uses one or more link quality metrics. The link quality metrics may, for example, include the error vector magnitude (EVM) of equalized constellations. Once baseline metrics are established, the method randomly selects a first or a second local oscillator (LO) adjustment strategy. For example, the first strategy may be to increase the LO frequency in the receiver by 500 Hz, and the second strategy may be to decrease the LO frequency in the receiver by 500 Hz. After the LO frequency is adjusted, the link quality metrics are evaluated using received packets. If the link quality metrics improve using the selected LO adjustment strategy, the selected LO adjustment strategy is repeated. Thus if the first strategy was selected, the LO frequency is increased by 500 Hz. If on the other hand, the second strategy was selected, the LO frequency is decreased by 500 Hz.

If the link quality metric measurements degrade after using the selected LO adjustment strategy, the other LO adjustment strategy is selected and the link quality metrics are evaluated. The LO adjustment process may be repeated continuously or periodically, depending on the stability of CFO in the link. A stopping criteria, such as, for example, link quality metric threshold, may be used to determine when to stop and re-start the LO adjustment process.

Figure 10:
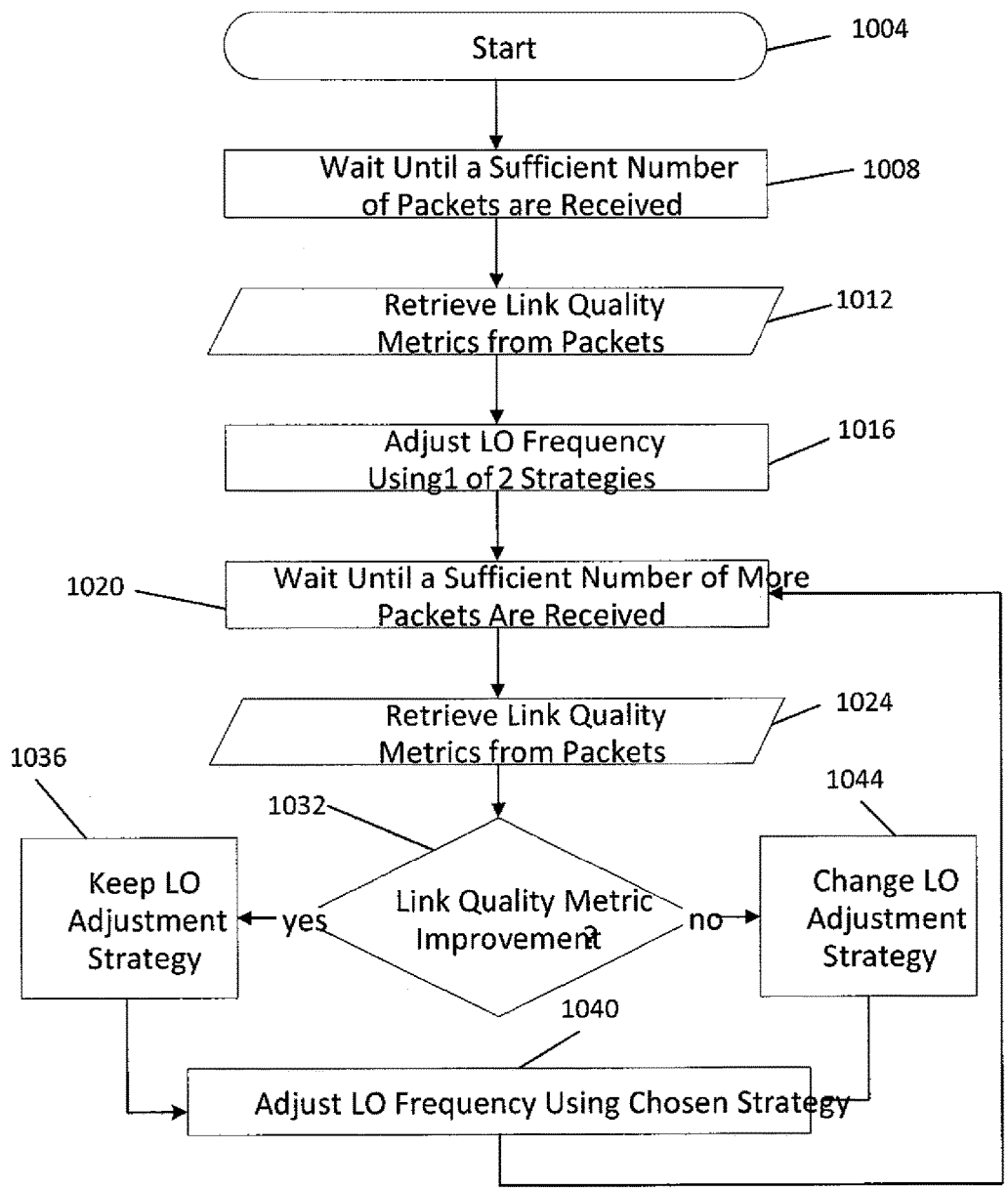
FIG. 10 is a flow diagram of a method for correcting CFO.

FIG. 10 is a flow diagram of a method for correcting CFO using link quality metrics correlated with CFO. The flow begins in step 1004 and moves to step 1008 where following a wait period, a predetermined number of packets are received. In step 1012, the received packets are evaluated and the link quality metrics are determined. In step 1016, a first or a second LO adjustment strategy is selected and the LO frequency is adjusted in accordance with the selected strategy. In step 1020, following a wait period, a predetermined number of packets are received. In step 1024, the received packets are evaluated and the link quality metrics are again determined. In decision block 1032, a determination is made whether the link quality metrics have improved or have degraded after the LO frequency was adjusted based on the selected LO adjustment strategy. If the link quality metrics improves following LO frequency adjustment, the flow moves to step 1036 where the selected LO frequency is repeated, and in step 1040 the LO frequency is adjusted again based on the previously selected strategy.

If the link quality metrics degrades following LO frequency adjustment, the flow moves to step 1044 where the LO adjustment strategy is changed and in step 1040 the LO frequency is changed to the other LO adjustment strategy. The flow then returns to step 1020. Thus, the selected LO adjustment strategy is continued as long as the link quality metrics continues to improve, but the LO adjustment strategy is changed is the link quality metrics degrades. Thus, if the first strategy (which, for example, requires the LO frequency to be increased by 500 Hz) is selected and the link quality metrics increases, the LO frequency is increased again by 500 Hz and the process is repeated until the link quality metrics degrades. If the second strategy (which, for example, requires the LO frequency to be decreased by 500 Hz) is selected and the link quality metrics increases, the LO frequency is decreased again by 500 Hz and the process is repeated until the link quality metrics degrades. According to disclosed embodiments, EVM measurements in a wireless link are used to adjust the frequency of phase locked loops (PLLs) on each signal path in a receiver.

Those skilled in the art will recognize that, for simplicity and clarity, the full structure and operation of all systems suitable for use with the present disclosure is not being depicted or described herein. Instead, only so much of systems as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

Those skilled in the art to which this application relates will appreciate that other and further additions, deletions, substitutions and modifications may be made to the described embodiments.

What is claimed is:

1. A method of correcting carrier frequency offsets (CFOs) in a wireless transceiver configured to transmit and receive RF signals on multiple signal paths, wherein the CFOs are generated on the multiple signal paths during up-conversion and down-conversion, comprising:

receiving a first predetermined number of data packets on a first signal path;

analyzing the first predetermined number of data packets to determine one or more wireless link quality metrics on the first signal path;

selecting a first local oscillator adjustment strategy for the first signal path;

adjusting a first local oscillator associated with the first signal path in accordance with the first local oscillator adjustment strategy;

receiving a second predetermined number of data packets on the first signal path;

analyzing the second predetermined number of data packets to determine the one or more wireless link quality metrics on the first signal path;

repeating the first local oscillator adjustment strategy if the wireless link quality metrics improve on the first signal path and adjusting the first local oscillator in accordance with the first local oscillator adjustment strategy;

changing to a second local oscillator adjustment strategy if the wireless link quality metrics worsen on the first signal path and adjusting the first local oscillator associated with the first signal path in accordance with the second local oscillator adjustment strategy;

receiving a third predetermined number of data packets on the first signal path;

analyzing the third predetermined number of data packets to determine the one or more link quality metrics on the first signal path;

repeating the second local oscillator adjustment strategy if the wireless link quality metrics improve on the first signal path and adjusting the first local oscillator associated with the first signal path in accordance with the second local oscillator adjustment strategy;

changing to the first local oscillator adjustment strategy if the wireless link quality worsen on the first signal path and adjusting the first local oscillator in accordance with the first local oscillator adjustment strategy, receiving a first predetermined number of data packets on a second signal path;

analyzing the first predetermined number of data packets to determine one or more wireless link quality metrics on the second signal path;

selecting a first local oscillator adjustment strategy for the second signal path;

adjusting a second local oscillator associated with the second signal path in accordance with the first local oscillator adjustment strategy;

receiving a second predetermined number of data packets on the second signal path;

analyzing the second predetermined number of data packets to determine the one or more wireless link quality metrics on the second signal path;

repeating the first local oscillator adjustment strategy if the wireless link quality metrics improve on the second signal path and adjusting the second local oscillator in accordance with the first local oscillator adjustment strategy;

changing to a second local oscillator adjustment strategy if the wireless link quality metrics worsen on the second signal path and adjusting the second local oscillator associated with the second signal path in accordance with the second local oscillator adjustment strategy;

receiving a third predetermined number of data packets on the second signal path;

analyzing the third predetermined number of data packets to determine the one or more link quality metrics on the second signal path;

repeating the second local oscillator adjustment strategy if the wireless link quality metrics improve on the second signal path and adjusting the second local oscillator in accordance with the second local oscillator adjustment strategy;

changing to the first local oscillator adjustment strategy if the wireless link quality worsen on the second signal path and adjusting the second local oscillator in accordance with the first local oscillator adjustment strategy, wherein CFOs are corrected by improving the link quality metrics on the multiple signal paths.

2. The method of claim 1, wherein the first local oscillator adjustment strategy is increasing the local oscillator frequency by a predetermined amount.

3. The method of claim 1, wherein the second local oscillator adjustment strategy is decreasing the local oscillator frequency by a predetermined amount.

4. The method of claim 1, wherein the wireless link quality metrics include an error vector magnitude (EVM).

5. The method of claim 1, further comprising adjusting the frequency of a phase locked loop (PLL) on each of the multiple signal paths in accordance with the first or the second local oscillator adjustment strategy.

6. The method of claim 1, further comprising continuing operation of the transceiver by repeating adjustment of the first and second local oscillators based on the previously selected local oscillator adjustment strategy until the wireless link quality metrics worsen.

7. A method of correcting carrier frequency offsets (CFOs) in a wireless transceiver configured to transmit and receive RF signals on multiple signal paths, wherein the CFOs are generated on the multiple signal paths during up-conversion and down-conversion, comprising:

receiving a first predetermined number of data packets on a first signal path;

analyzing the first predetermined number of data packets to determine one or more wireless link quality metrics on the first and signal path;

increasing the frequency of a first local oscillator associated with the first signal path by a predetermined amount;

receiving a second predetermined number of data packets on the first signal path;

analyzing the second predetermined number of data packets to determine the one or more wireless link quality metrics on the first signal path;

increasing the frequency of the first local oscillator associated with the first signal paths, by the predetermined amount if the wireless link quality metrics improve;

decreasing the frequency of the first local oscillator by the predetermined amount if the wireless link quality metrics worsen;

receiving a third predetermined number of data packets on the first signal path;

analyzing the third predetermined number of data packets to determine the one or more link quality metrics on the first signal path;

decreasing the frequency of the first local oscillator by the predetermined amount if the wireless link quality metrics improve;

increasing the frequency of the first local oscillator by the predetermined amount if the wireless link quality metrics worsen;

receiving a first predetermined number of data packets on a second signal path;

analyzing the first predetermined number of data packets to determine one or more wireless link quality metrics on the second and signal path;

increasing the frequency of a second local oscillator associated with the second signal path by a predetermined amount;

receiving a second predetermined number of data packets on the second signal path;

analyzing the second predetermined number of data packets to determine the one or more wireless link quality metrics on the second signal path;

increasing the frequency of the second local oscillator by the predetermined amount if the wireless link quality metrics improve;

decreasing the frequency of the second local oscillator by the predetermined amount if the wireless link quality metrics worsen;

receiving a third predetermined number of data packets on the second signal path;

analyzing the third predetermined number of data packets to determine the one or more link quality metrics on the second signal path;

decreasing the frequency of the second local oscillator by the predetermined amount if the wireless link quality metrics improve on the second signal path;

increasing the frequency of the second local oscillator by the predetermined amount if the wireless link quality metrics worsen on the second signal path, wherein CFOs are corrected by improving the link quality metrics on the multiple signal paths.

8. The method of claim 7, wherein the wireless link quality metrics include an error vector magnitude (EVM).

9. A method of improving quality of a wireless link in a wireless transceiver configured to transmit and receive RF signals on multiple signal paths, comprising:

determining one or more wireless link quality metrics on at least a first and second signal paths;

selecting a first local oscillator adjustment strategy for the first signal path and adjusting a first local oscillator on the first signal path in accordance with the first local oscillator adjustment strategy;

determining, after a predetermined time period, the one or more wireless link quality metrics on the first signal path;

repeating the first local oscillator adjustment strategy if the wireless link quality metrics improve on the first signal path;

switching to a second local oscillator adjustment strategy if the wireless link quality metrics worsen on the first signal path and adjusting the first local oscillator on the first signal path in accordance with the second local oscillator adjustment strategy, selecting a first local oscillator adjustment strategy for the second signal path and adjusting a second local oscillator on the second signal path in accordance with the first local oscillator adjustment strategy;

determining, after a predetermined time period, the one or more wireless link quality metrics on the second signal path;

repeating the first local oscillator adjustment strategy if the wireless link quality metrics improve on the second signal path;

switching to a second local oscillator adjustment strategy if the wireless link quality metrics worsen on the second signal path and adjusting the second local oscillator on the first signal path in accordance with the second local oscillator adjustment strategy, wherein the quality of the wireless link is improved by adjusting the first and second local oscillators without measuring carrier frequency offsets (CFOs).

10. The method of claim 9, wherein the first local oscillator adjustment strategy is increasing the frequency of the first and second local oscillators by a predetermined amount.

11. The method of claim 9, wherein the second local oscillator adjustment strategy is decreasing the frequency of the first and second local oscillators by a predetermined amount.

* * * * *